(12) United States Patent
Kamiyama

(10) Patent No.: US 11,427,151 B2
(45) Date of Patent: Aug. 30, 2022

(54) AIRBAG

(71) Applicant: NIHON PLAST CO., LTD., Fujinomiya (JP)

(72) Inventor: Takuya Kamiyama, Shizuoka (JP)

(73) Assignee: NIHON PLAST CO., LTD., Fujinomiya (JP)

( * ) Notice: Subject to any disclaimer, the term of this patent is extended or adjusted under 35 U.S.C. 154(b) by 0 days.

(21) Appl. No.: 17/117,155

(22) Filed: Dec. 10, 2020

(65) Prior Publication Data

US 2021/0179007 A1 Jun. 17, 2021

(30) Foreign Application Priority Data

Dec. 11, 2019 (JP) .............................. JP2019-223899

(51) Int. Cl.
| | |
|---|---|
| *B60R 21/237* | (2006.01) |
| *B60R 21/233* | (2006.01) |
| *B60R 21/26* | (2011.01) |
| *B60R 21/232* | (2011.01) |
| *B60R 21/2338* | (2011.01) |
| *B60R 21/21* | (2011.01) |

(52) U.S. Cl.
CPC .......... *B60R 21/237* (2013.01); *B60R 21/233* (2013.01); *B60R 21/26* (2013.01); *B60R 21/21* (2013.01); *B60R 21/232* (2013.01); *B60R 21/2338* (2013.01); *B60R 2021/23386* (2013.01)

(58) Field of Classification Search
CPC ... B60R 21/237; B60R 21/233; B60R 21/232; B60R 21/213; B60R 21/23138; B60R 21/207; B60R 21/214; B60R 2021/23146; B60R 2021/0006; B60R 2021/23192; B60R 2021/2375
USPC ...................................................... 280/730.2
See application file for complete search history.

(56) References Cited

U.S. PATENT DOCUMENTS

| | | | |
|---|---|---|---|
| 2003/0116947 A1* | 6/2003 | Yokoyama ............ | B60R 21/237 280/730.2 |
| 2021/0261087 A1* | 8/2021 | Wang .................... | B60R 21/237 |

FOREIGN PATENT DOCUMENTS

JP 2016-022918 2/2016

\* cited by examiner

*Primary Examiner* — Keith J Frisby
(74) *Attorney, Agent, or Firm* — Amin, Turocy & Watson, LLP

(57) ABSTRACT

Provided are an airbag in which an airbag main body section can be effectively unfolded inside a vehicle compartment. The airbag includes an airbag main body section formed in a bag shape, and a gas introduction section that communicates with the airbag main body section, and to which gas is supplied. The airbag main body section in a folded state has a first roll fold section formed by folding a tip side in an unfolding direction, and a second roll fold section formed by folding at least a portion on a base end side in the unfolding direction from the first roll fold section, and having a roll center at a position different from a roll center of the first roll fold section.

2 Claims, 4 Drawing Sheets

AIRBAG

CROSS REFERENCE TO RELATED APPLICATIONS

This application is entitled to and claims the benefit of Japanese Patent Application No. 2019-223899, filed on Dec. 11, 2020, the disclosure of which including the specification, drawings and abstract is incorporated herein by reference in its entirety.

TECHNICAL FIELD

The present disclosure relates to an airbag laterally unfolded inside a vehicle compartment.

BACKGROUND ART

Conventionally, a curtain airbag apparatus is known as an airbag apparatus including an airbag inflated and unfolded by introduced gas. In the curtain airbag apparatus, the airbag having a longitudinal shape is unfolded forward and rearward along a predetermined surface including a pillar section of a lateral part and a window section of a door of a vehicle compartment in an automobile.

Normally, the airbag is thinly elongated and folded, and is disposed along a roof side section of an upper edge portion of the window section. Then, when the automobile receives an impact due to a side collision or overturning (rollover), gas is supplied from an inflator, and the airbag is inflated and unfolded downward along a window glass of the lateral part. In this manner, an occupant is restricted to protect a head of the occupant.

As the airbag, the following technique is known. A lower end portion of the airbag is folded back, when the airbag is folded. The airbag is folded in a roll shape from a lower side to an upper side around a folded portion thereof (for example, refer to PTL 1).

Citation List

Patent Literature

PTL 1
Japanese Patent Application Laid-Open No. 2016-22918 (pages 7 to 10, FIGS. 2 to 6)

SUMMARY OF INVENTION

Technical Problem

When a collision speed is fast and a collision weight is heavy during a side collision, a door trim forcibly enters an inside of a vehicle compartment. In order to cope with this entry of the door trim, it is necessary that an airbag is reliably unfolded into the vehicle compartment.

An aspect of the present disclosure aims to provide an airbag in which an airbag main body section can be effectively unfolded inside a vehicle compartment.

Solution to Problem

According to an aspect of the present disclosure, there is provided an airbag including an airbag main body section formed in a bag shape, and a gas introduction section that communicates with the airbag main body section, and to which gas is supplied. The gas is supplied to the airbag main body section via the gas introduction section so that the airbag main body section in a folded state is laterally unfolded inside a vehicle compartment. The airbag main body section in the folded state has a first roll fold section formed by folding a tip side in an unfolding direction, and a second roll fold section formed by folding at least a portion on a base end side in the unfolding direction from the first roll fold section, and having a roll center at a position different from a roll center of the first roll fold section.

Advantageous Effects of Invention

According to the present disclosure, the airbag main body section can be effectively unfolded into the vehicle compartment.

DESCRIPTION OF EMBODIMENTS

Figure 1A:
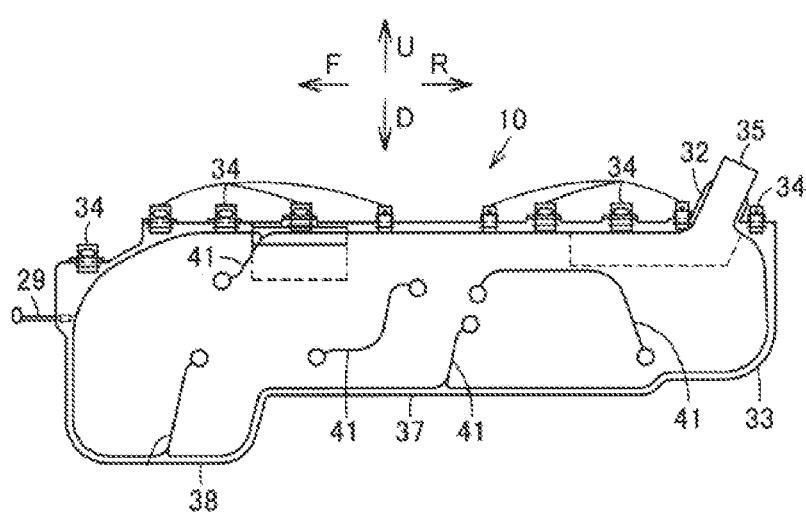
FIG. 1A is a side view schematically illustrating an airbag according to an aspect of the present disclosure.

Hereinafter, embodiments of the present disclosure will be described with reference to the drawings. The same reference numerals will be assigned to common configuration elements in each figure, and description thereof will be omitted as appropriate.

Figure 4:
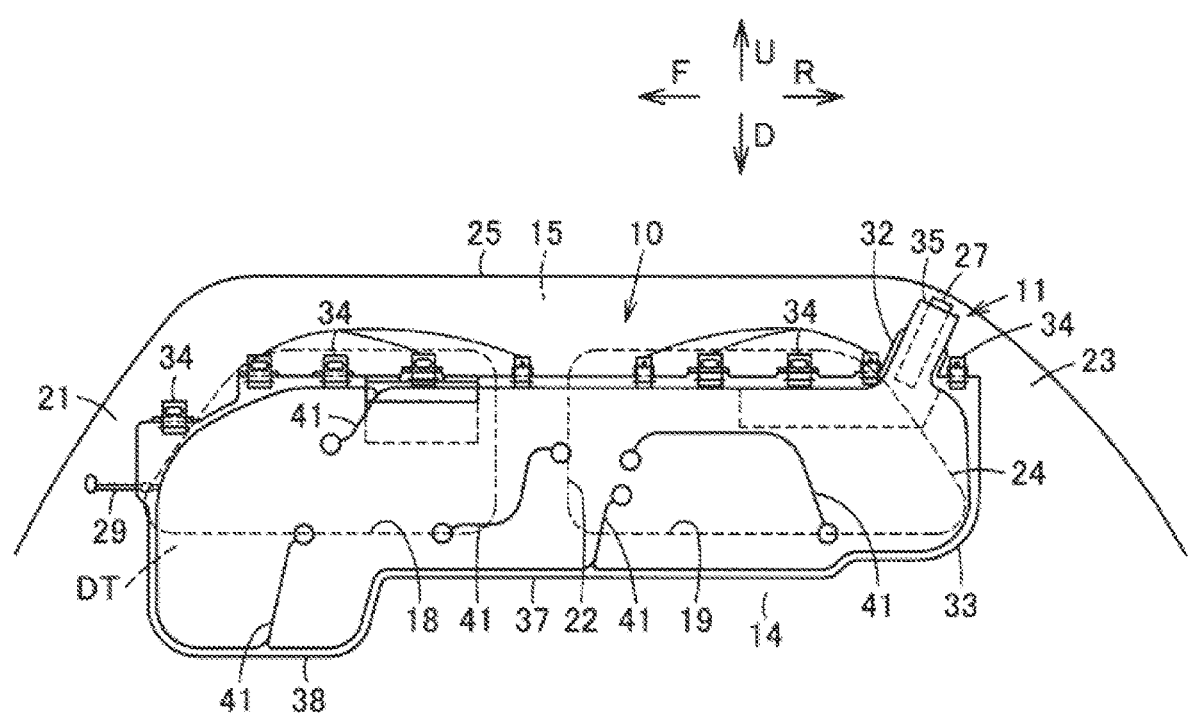
FIG. 4 is a side view schematically illustrating a state where the airbag according to the aspect of the present disclosure is attached to a vehicle body.

In FIG. 4, reference numeral 10 indicates an airbag provided in a vehicle (for example, an automobile). Airbag apparatus 11 including airbag 10 is also called a curtain airbag apparatus.

Airbag apparatus 11 is disposed on roof side section 15 serving as a storage position inside vehicle compartment 14.

Airbag 10 is also called a curtain airbag, an airbag for a side collision, an inflatable curtain, or a head protecting airbag. When the vehicle receives an impact due to the side collision, or when the vehicle is overturned (rolled over), airbag 10 is unfolded in a substantially planar shape in a predetermined direction (for example, downward) on a lateral side of an occupant (example of a protection target) of the vehicle. In this manner, a head of the occupant can be protected.

In the following description, directions such as a forward-rearward direction (vehicle length direction), a rightward-leftward direction (vehicle width direction), and an upward-downward direction (vehicle height direction) are defined, based on a straight traveling direction of the vehicle, and indicate a forward direction (direction of an arrow F), a rearward direction (direction of an arrow R), an upward direction (direction of an arrow U), a downward direction (direction of an arrow D), an outward direction (direction of an arrow W) of vehicle compartment 14, and an inward direction (direction of an arrow C) of vehicle compartment 14.

Vehicle compartment 14 is provided with a front seat and a rear seat which are seats on which occupants can sit. In addition, a vehicle body is provided with doors respectively corresponding to the front seat and the rear seat. Upper portions of the door are provided with (first) window section 18 and (second) window section 19, as side windows covered with an openable glass.

In addition, both sides of vehicle compartment 14 are provided with front pillar 21 (also called an A-pillar) as a (first) columnar body, center pillar 22 (also called a B-pillar) as a (second) columnar body, and rear pillar 23 (also called a C-pillar) as a (third) columnar body in this order from a front side of vehicle compartment 14.

Window section 18 is located rearward of front pillar 21 and forward of center pillar 22. Window section 19 is located rearward of center pillar 22 and forward of rear pillar 23.

Window sections 18 and 19, the doors, and respective pillars 21, 22, and 23 form predetermined surface 24 on which airbag 10 is unfolded on both sides of vehicle compartment 14.

Vehicle body panel 25 forming an attachment target member (also called a roof side rail) is provided on an upper side of pillars 21, 22, and 23, that is, on an upper edge portion which is an edge portion of window sections 18 and 19. A ceiling panel serving as a ceiling section is supported via vehicle body panel 25.

A front glass (front windshield) is provided on a front side of front pillars 21 on both sides. A rear glass is provided on a rear side of rear pillars 23 on both sides.

Roof side section 15 serving as a storage position is set from edge portions on both sides of the ceiling panel to portions formed over an entire length of front pillar 21 and rear pillar 23 which extend in a direction intersecting with the edge portions. In addition, predetermined surface 24 is set inside an arc virtually formed by the edge portions on both sides of the ceiling panel, front pillar 21, and rear pillar 23.

Center pillar 22 does not indicate the pillar sections in front and rear end portions, and indicate the pillar sections covered with unfolded airbag 10. In addition, depending on a type of vehicles, for example, four or more pillar sections may be provided on one side in some cases. Third and subsequent pillar sections from the front will be described as rear pillar 23.

Airbag apparatus 11 is an airbag apparatus for front and rear seats which can protect occupants sitting on the front seat and the rear seat. Airbag apparatus 11 includes at least airbag 10 and inflator 27.

Airbag 10 is thinly elongated, folded, and stored along roof side section 15 (that is, an upper edge of a door opening part of the vehicle body) surrounded by vehicle body panel 25 and a head lining (ceiling covering member as an interior material continuous from an upper end of respective pillars 21, 22, and 23 to a ceiling).

Inflator 27 is a gas generator stored rearward or upward of the rear seat to supply gas to airbag 10.

Furthermore, airbag apparatus 11 has a bracket (not illustrated), a sleeve (not illustrated), and tether belt 29.

The bracket is a member that attaches airbag 10 to the vehicle body panel. For example, the bracket is formed by carrying out pressing work for a metal plate.

The sleeve is a member which can hold a shape of folded airbag 10 and can be broken. The sleeve is a cylindrical or string-shaped member.

Tether belt 29 is a tether section connected to a front end portion of airbag 10.

An indoor side of vehicle compartment 14 of respective pillars 21, 22, and 23 is covered with a cover body serving as a structure, that is, a pillar garnish serving as a covering interior material.

Figure 1B:
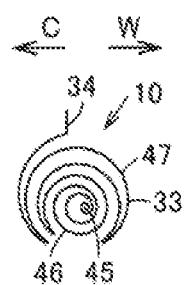
FIG. 1B is a sectional view schematically illustrating a folded state of the airbag according to the aspect of the present disclosure.

As illustrated in FIGS. 1A, 1B, and 4, airbag 10 includes gas introduction section 32 into which the gas is introduced from inflator 27, and airbag main body section 33 formed in a flat bag shape.

Gas introduction section 32 is located on an upper side which is an unfolding base end side of airbag main body section 33. Inflator 27 is inserted into gas introduction section 32. That is, gas introduction section 32 functions as an inflator connection section.

A plurality of upper edge portions of airbag 10 are attached to the vehicle body side via a plurality of attachment portions 34. In addition, for example, a front end portion of airbag 10 is attached to the vehicle body side by tether belt 29. In a folded state where airbag 10 is thinly elongated, airbag 10 is stored in a longitudinal shape along the forward-rearward direction in roof side section 15 (located upward of center pillar 22).

In the present embodiment, a case where airbag 10 is a rear mount type in which gas introduction section 32 protrudes on a rear side of an upper portion of airbag main body section 33 has been described as an example. However, the present disclosure is not limited thereto. For example, airbag 10 may be a center mount type in which gas introduction section 32 protrudes on a central portion in the forward-rearward direction of the upper portion of airbag main body section 33.

Gas introduction section 32 and airbag main body section 33 are formed of a single or a plurality of base fabrics. Outer edge portions of the base fabric are joined to each other by means of sewing so that gas introduction section 32 and airbag main body section 33 are provided in airbag 10. Insertion opening 35 into which inflator 27 is inserted is provided in a rear end portion (upper end portion) of gas introduction section 32.

Airbag main body section 33 has main body inflation section 37 and protrusion section 38 which are inflated by the introduced gas.

Main body inflation section 37 is disposed on a lateral side of the occupant when airbag 10 is in an unfolded state. Main body inflation section 37 is a section on predetermined surface 24 which covers regions corresponding to window sections 18 and 19 and is unfolded to front and rear regions extending from the front seat to the lateral side of the rear seat. Main body inflation section 37 is formed in a longitudinal shape in the forward-rearward direction. Main body inflation section 37 is a section which communicates with gas introduction section 32 and into which the gas is directly introduced from gas introduction section 32.

Protrusion section 38 is a section which can be called a vehicle external release prevention section. When airbag 10 is in an unfolded state, protrusion section 38 is a section which hangs on door trim DT that covers the inside of the vehicle compartment of the door in a lower edge of the window section 18. In this manner, protrusion section 38 prevents the occupant sitting on the front seat from being released outward of the vehicle from window section 18.

When airbag 10 is in an unfolded state, protrusion section 38 extends downward on a side opposite to gas introduction section 32 with reference to main body inflation section 37. In addition, protrusion section 38 is located at a lower portion on the front side of main body inflation section 37. Protrusion section 38 communicates with main body inflation section 37. That is, protrusion section 38 is a section which communicates with gas introduction section 32 via main body inflation section 37, and into which a portion of the introduced gas of main body inflation section 37 is introduced via main body inflation section 37.

A plurality of non-inflation sections 41 are formed in airbag main body section 33, as restriction sections for restricting a flow of the gas. In this manner, a plurality of air chambers are formed in main body inflation section 37 and protrusion section 38.

Non-inflation section 41 is formed as a joint section to which the base fabric forming airbag main body section 33 is joined. Non-inflation sections 41 are respectively formed in a linear shape, and a tip portion thereof has a protective portion to which the base fabric is joined in a circular shape.

Since the protective portion is provided, when airbag main body section 33 is inflated and unfolded, it is possible to ensure stretching of the base fabric, and it is possible to prevent wrinkles. In addition, since the protective portion is provided, when airbag main body section 33 is inflated and unfolded, it is possible to obtain sufficient strength against stress concentration generated in an end portion of non-inflation section 41. A position and a shape of non-inflation section 41 are not limited to the illustrated example, and may be set in any desired manner.

When airbag 10 is in a folded state, first roll fold section 45 and second roll fold section 46 are formed in airbag main body section 33. In addition, in the present embodiment, when airbag 10 is in the folded state, bellows fold section 47 is further formed in airbag main body section 33.

First roll fold section 45 is formed by folding a tip side, that is, a lower end side of airbag main body section 33 in an unfolding direction. That is, first roll fold section 45 is formed by folding an end portion opposite to gas introduction section 32 in airbag main body section 33 in a roll shape. In the present embodiment, first roll fold section 45 is formed by folding protrusion section 38 in a roll shape.

First roll fold section 45 is a section that is unfolded subsequently to bellows fold section 47 and second roll fold section 46, when airbag main body section 33 is inflated. That is, first roll fold section 45 is unfolded later than second roll fold section 46 and bellows fold section 47, when airbag main body section 33 is inflated.

Second roll fold section 46 is formed by folding a base end side in the unfolding direction from first roll fold section 45, that is, an upper portion of first roll fold section 45 in airbag main body section 33. Second roll fold section 46 is formed by folding at least a portion of main body inflation section 37 connected to protrusion section 38 in a roll shape.

Second roll fold section 46 is formed by folding a lower portion of main body inflation section 37 on protrusion section 38 side in a roll shape. As illustrated in FIG. 1B, for example, second roll fold section 46 is formed by folding a lower half of main body inflation section 37 in a roll shape.

Second roll fold section 46 has a roll center at a position different from a roll center of first roll fold section 45. Second roll fold section 46 is formed in a roll shape by rolling first roll fold section 45. That is, as illustrated in FIG. 1B, first roll fold section 45 is located inside second roll fold section 46. Therefore, at least a portion of second roll fold section 46 is located between first roll fold section 45 and gas introduction section 32. Second roll fold section 46 is a section that is unfolded subsequently to bellows fold section 47, when airbag main body section 33 is inflated. That is, second roll fold section 46 is unfolded later than bellows fold section 47, when airbag main body section 33 is inflated.

Bellows fold section 47 is formed by folding a base end side in the unfolding direction from second roll fold section 46, that is, an upper portion of second roll fold section 46 in airbag main body section 33. That is, bellows fold section 47 is formed by folding a remaining other portion of main body inflation section 37 connected to second roll fold section 46 in a bellows shape. Bellows fold section 47 is formed by folding the upper portion of main body inflation section 37 in a roll shape. As illustrated in FIG. 1B, for example, bellows fold section 47 is formed by folding the upper half of main body inflation section 37 in a bellows shape.

Bellows fold section 47 is stacked on the outside of second roll fold section 46 to cover first roll fold section 45 and second roll fold section 46. Therefore, at least a portion of bellows fold section 47 is located between second roll fold section 46 and gas introduction section 32. Bellows fold section 47 is a section that is first unfolded by the gas introduced from gas introduction section 32, when airbag main body section 33 is inflated.

Next, a folding method of airbag 10 will be described with reference to FIGS. 2A to 2H.

Airbag 10 is formed to have airbag main body section 33 and gas introduction section 32 by causing a joint section to join the outer edge portions of the base fabric and joining the base fabric in non-inflation section 41.

First, airbag main body section 33 is unfolded in a planar shape, and rod-shaped first saber S1 (example of a first jig) is used to form first roll fold section 45 (first step).

Hereinafter, the first step will be specifically described.

Figure 2A:
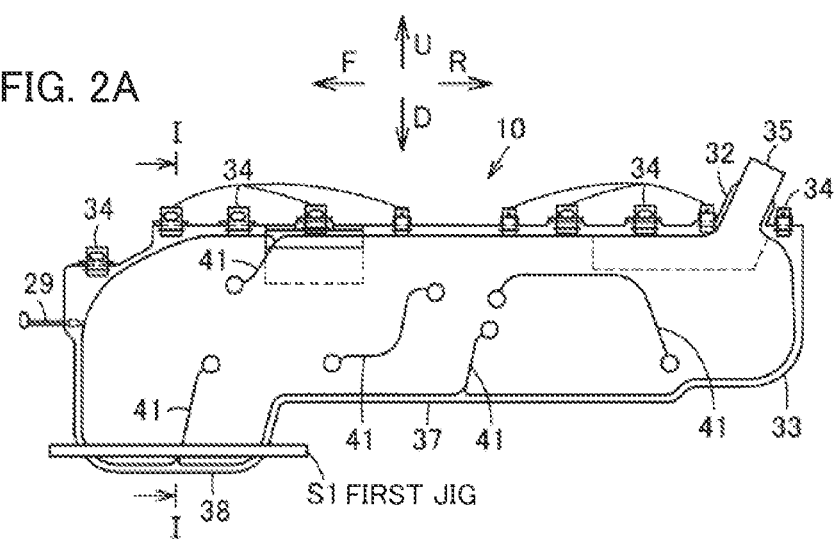
FIG. 2A is a side view schematically illustrating a folding method of an airbag according to another aspect of the present disclosure.
Figure 2B:
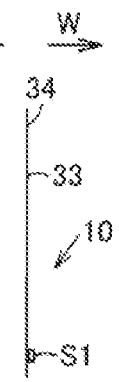
FIG. 2B is a sectional view schematically illustrating a position corresponding to line I-I in FIG. 2A.

First, as illustrated in FIGS. 2A and 2B, first saber S1 is installed in airbag main body section 33 along the forward-rearward direction (direction intersecting with the unfolding direction of airbag main body section 33). For example, first saber S1 is installed at a position in the vicinity of a lower end of protrusion section 38 of airbag main body section 33.

First saber S1 is formed to be longer than the length of protrusion section 38 in the forward-rearward direction. First saber S1 is disposed over the entire forward-rearward direction of at least protrusion section 38. In this manner, both end portions of first saber S1 extend forward and rearward from protrusion section 38 (refer to FIG. 2A).

Figure 2C:
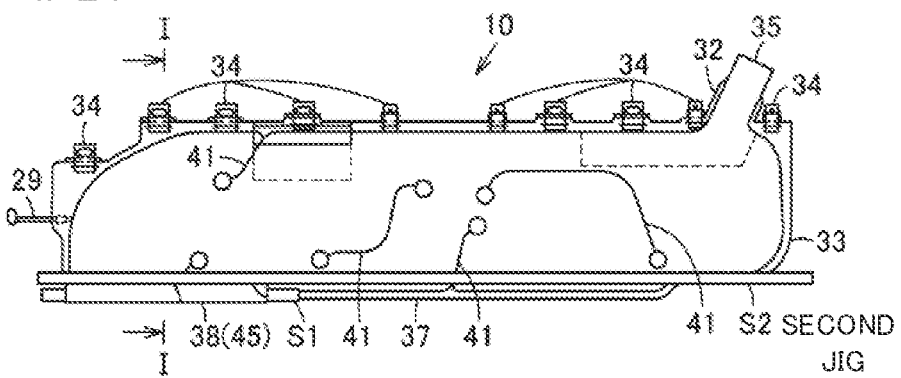
FIG. 2C is a side view schematically illustrating the folding method of the airbag according to the aspect of the present disclosure.
Figure 2D:
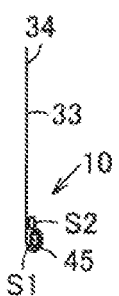
FIG. 2D is a sectional view schematically illustrating a position corresponding to line I-I in FIG. 2C.

Next, as illustrated in FIGS. 2C and 2D, a portion of airbag main body section 33 (for example, protrusion section 38) is folded upward in a roll shape by using first saber S1, thereby forming first roll fold section 45. That is, first roll fold section 45 is folded in a roll shape formed around a lower end portion of protrusion section 38 of airbag main body section 33. In this case, first roll fold section 45 is rolled outward of the vehicle compartment.

Hitherto, the first step has been specifically described.

After the first step, rod-shaped second saber S2 (example of a second jig) is used to form second roll fold section 46 (second step).

Hereinafter, the second step will be specifically described.

First, as illustrated in FIGS. 2C and 2D, second saber S2 is installed along the forward-rearward direction (direction intersecting with the unfolding direction of airbag main body section 33) at a winding end position of first roll fold section 45 of airbag main body section 33. For example, second saber S2 is disposed parallel to or substantially parallel to first saber S1 along the lower end of main body inflation section 37 of airbag main body section 33.

Second saber S2 is formed to be longer than the length of main body inflation section 37 in the forward-rearward direction. Second saber S2 is longer than first saber S1. Second saber S2 is disposed over the entire forward-rearward direction of at least main body inflation section 37. In this manner, both end portions of second saber S2 extend forward and rearward from main body inflation section 37.

Figure 2E:
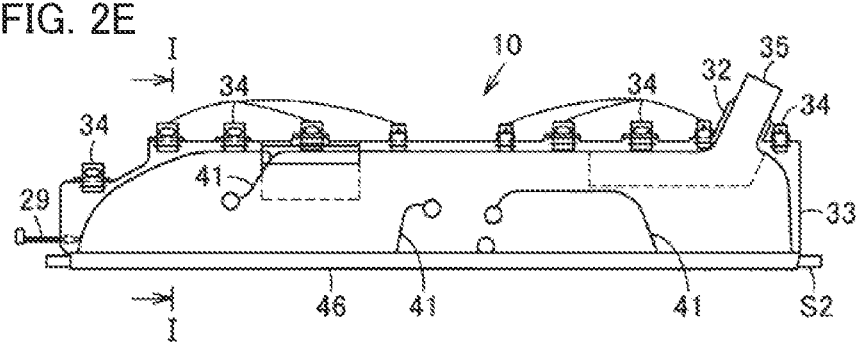
FIG. 2E is a side view schematically illustrating the folding method of the airbag according to the aspect of the present disclosure.
Figure 2F:
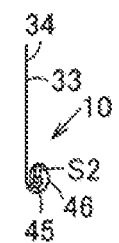
FIG. 2F is a sectional view schematically illustrating a position corresponding to line I-I in FIG. 2E.

Next, as illustrated in FIGS. 2E and 2F, first saber S1 is pulled out, and second saber S2 is used so that at least a portion of the remaining portion of airbag main body section 33 (at least a portion of main body inflation section 37, for example, the lower portion of main body inflation section 37) is folded upward in a roll shape, thereby forming second roll fold section 46 (FIGS. 2E and 2F). That is, second roll fold section 46 is folded in a roll shape formed around the lower end portion of main body inflation section 37 of airbag main body section 33. In this case, second roll fold section 46 is rolled outward of the vehicle compartment. Therefore, second roll fold section 46 rolls first roll fold section 45, and has the roll center different from the roll center of first roll fold section 45. In this manner, second roll fold section 46 is formed.

Hitherto, the second step has been specifically described.

Figure 2G:
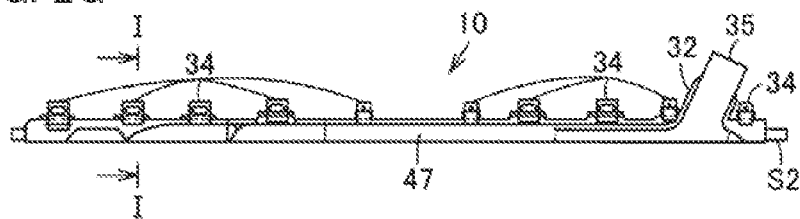
FIG. 2G is a side view schematically illustrating the folding method of the airbag according to the aspect of the present disclosure.
Figure 2H:
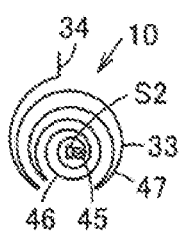
FIG. 2H is a sectional view schematically illustrating a position corresponding to line I-I in FIG. 2G.

After the second step, as illustrated in FIGS. 2G and 2H, the other portions of the remaining portion of airbag main body section 33 (remaining other portions of main body inflation section 37, for example, the upper portion of main body inflation section 37) are alternately folded inward of the vehicle compartment and outward of the vehicle compartment to form a bellows shape. Bellows fold section 47 is formed to wrap first roll fold section 45 and second roll fold section 46 in a parasol shape (third step).

Second saber S2 may be pulled out before bellows fold section 47 is formed, or may be pulled out after bellows fold section 47 is formed.

As described above, in airbag 10, airbag main body section 33 is folded in a predetermined thinly elongated shape. Inflator 27 illustrated in FIG. 4 is inserted into insertion opening 35 of gas introduction section 32. In folded airbag main body section 33, a folded shape is held so that binding is released (that is, broken) due to the pressure generated when airbag main body section 33 is unfolded, by using a sleeve (not illustrated) holds. In this way, in airbag 10, airbag main body section 33 is thinly elongated and folded, and is brought into a state where the folded shape is held, thereby forming the airbag apparatus 11 serving as a curtain airbag module.

Airbag apparatus 11 including airbag 10 folded as described above is incorporated into vehicle compartment 14, and work for attaching airbag apparatus 11 to the vehicle body (hereinafter, referred to as attachment work) is carried out. The attachment work is carried out before interior materials such as a head lining and a pillar garnish are attached.

In the attachment work, a plurality of attachment portions 34 and tether belt 29 of airbag 10 are fixedly attached to the vehicle body by using a fixture (not illustrated) such as bolts. In addition, in the attachment work, inflator 27 is fixedly attached to roof side section 15. In addition, in the attachment work, it is preferable to tune an assembly angle of airbag 10 so that the roll center of first roll fold section 45 and the roll center of second roll fold section 46 are aligned with each other in the vehicle width direction.

In addition, in the attachment work, a harness (not illustrated) led out from inflator 27 is connected to a control apparatus (not illustrated) provided in the vehicle body. Thereafter, the head lining is attached to a ceiling panel of the vehicle body to cover airbag apparatus 11, and the pillar garnish is attached to each of pillars 21, 22, and 23.

As described above, the attachment work for attaching the airbag apparatus 11 to the vehicle body is completed.

In a state where the attachment work is completed, airbag apparatus 11 is isolated from the inside of vehicle compartment 14 by the head lining and the pillar garnish. Inflator 27 inserted into gas introduction section 32 and folded airbag main body section 33 are held at positions above the pillar garnish.

In this state, inflator 27 is brought into a state of being exposed outward from airbag 10, and is integrally fixed to the vehicle body (for example, roof side section 15).

Hereinafter, a behavior of airbag apparatus 11 when a side collision of the vehicle or a rollover of the vehicle occurs will be described.

First, the control apparatus operates inflator 27. In this manner, the gas injected from inflator 27 is introduced into airbag main body section 33 after gas introduction section 32 is inflated.

Figure 3A:
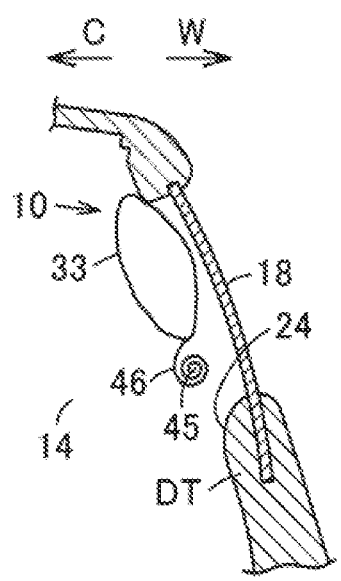
FIG. 3A is a sectional view schematically illustrating an unfolding behavior of the airbag according to the aspect of the present disclosure.

Next, in airbag main body section 33, bellows fold section 47 directly communicating with gas introduction section 32 is unfolded downward, and first roll fold section 45 and second roll fold section 46 are pushed downward (refer to FIG. 3A).

Figure 3B:
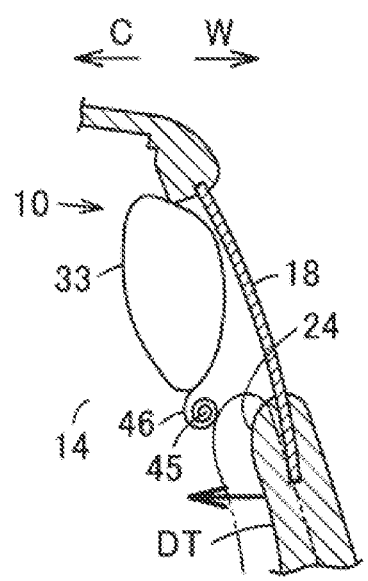
FIG. 3B is a sectional view schematically illustrating an unfolding behavior of the airbag according to the aspect of the present disclosure.

Next, second roll fold section 46 into which the gas is introduced from bellows fold section 47 is gradually released and unfolded downward (refer to FIG. 3B). Subsequently, first roll fold section 45 into which the gas is introduced from second roll fold section 46 is gradually released and unfolded downward (refer to FIG. 3B).

That is, the lower end portion of airbag main body section 33 is gradually released from second roll fold section 46 to first roll fold section 45. Therefore, second roll fold section 46 or first roll fold section 45 comes into contact with the inner surface of the vehicle compartment in the upper portion of door trim DT greatly protruding inward of vehicle compartment 14, and airbag main body section 33 is reliably located inside vehicle compartment 14.

Figure 3C:
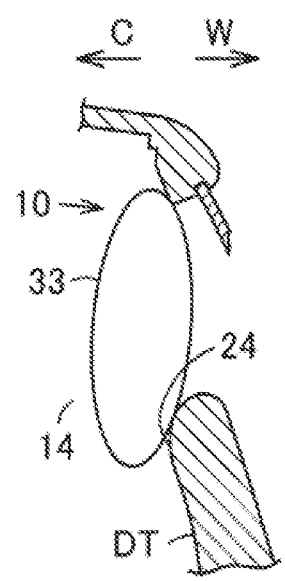
FIG. 3C is a sectional view schematically illustrating an unfolding behavior of the airbag according to the aspect of the present disclosure.

Next, first roll fold section 45 is released, and airbag main body section 33 is inflated and unfolded in a planar shape inside vehicle compartment 14 along the lateral part of vehicle compartment 14 (refer to FIG. 3C). In this manner, the occupant can be protected.

As described above, in the present embodiment, first roll fold section 45 is formed by first saber S1 installed along the direction intersecting with the unfolding direction of airbag main body section 33 so that a portion on the lower end side which is the tip side of airbag main body section 33 in the unfolding direction is folded in a roll shape. Second roll fold section 46 is formed by rod-shaped second saber S2 installed along the direction intersecting with the unfolding direction of airbag main body section 33 at the winding end position of first roll fold section 45 so that at least a portion of the remaining portion of airbag main body section 33 is folded in a roll shape.

In this manner, airbag main body section 33 in the folded state has first roll fold section 45 and second roll fold section 46 having the roll center at the position different from that of the roll center of first roll fold section 45.

Therefore, when the gas is introduced into airbag main body section 33 from gas introduction section 32, airbag main body section 33 is brought into an unfolding mode in which the roll is gradually released from second roll fold section 46 to first roll fold section 45. Therefore, an unfolding behavior is stabilized. Even when a collision speed is fast and a collision weight is heavy during a side collision and door trim DT forcibly enters the inside of the vehicle compartment, the tip side, that is, the lower end side of airbag main body section 33 comes into contact with door trim DT. In this manner, airbag main body section 33 can be effectively unfolded inside the vehicle compartment. Therefore, the lower end side of airbag main body section 33 is reliably caught on door trim DT, and the occupant can be effectively prevented from being released outward of the vehicle.

In addition, in the present embodiment, first roll fold section 45 is formed by folding protrusion section 38 of airbag main body section 33 in a roll shape, and second roll fold section 46 is formed by folding at least a portion of main body inflation section 37 of airbag main body section 33 connected to protrusion section 38 in a roll shape.

In this manner, the unfolding behavior can be stabilized, even in airbag main body section 33 which has protrusion section 38 protruding downward from main body inflation section 37, whose lower end side length is not constant, and which has a stepped shape.

In addition, in the present embodiment, bellows fold section 47 is formed by folding the remaining other portions of main body inflation section 37 connected to second roll fold section 46 in a bellows shape.

In this manner, when the gas is supplied from gas introduction section 32 to airbag main body section 33, bellows fold section 47 is quickly unfolded earlier than second roll fold section 46 and first roll fold section 45. Second roll fold section 46 and first roll fold section 45 can be pushed to the tip side, that is, downward. Therefore, the tip side, that is, the lower end side of airbag main body section 33 can be more reliably brought into contact with door trim DT, and airbag main body section 33 can be more effectively unfolded inside the vehicle compartment.

In the above-described embodiment, the same operational effects can be achieved, even when a folding start position (position of first saber S1) of first roll fold section 45 is obliquely inclined with respect to the forward-rearward direction.

In addition, bellows fold section 47 may be formed by using any desired folding method other than the above-described folding method.

Airbag main body section 33 may be folded by adding another folding method in addition to adopting first roll fold section 45, second roll fold section 46, and bellows fold section 47.

SUMMARY OF PRESENT DISCLOSURE

Hereinafter, the embodiments of the present disclosure described above will be summarized According to the present disclosure, there is provided the airbag including the airbag main body section formed in a bag shape, and the gas introduction section that communicates with the airbag main body section, and to which the gas is supplied. The gas is supplied to the airbag main body section via the gas introduction section so that the airbag main body section in a folded state is laterally unfolded inside a vehicle compartment. The airbag main body section in the folded state has the first roll fold section formed by folding the tip side in the unfolding direction, and the second roll fold section formed by folding at least a portion on the base end side in the unfolding direction from the first roll fold section, and having the roll center at the position different from the roll center of the first roll fold section.

According to the aspect, in the airbag of the present disclosure, when the gas is introduced into the airbag main body section from the gas introduction section, the airbag main body section is brought into the unfolding mode in which the roll is gradually released from the second roll fold section to the first roll fold section. Therefore, the unfolding behavior is stabilized. Even when the collision speed is fast and the collision weight is heavy during the side collision and the door trim forcibly enters the inside of the vehicle compartment, the tip side of the airbag main body section comes into contact with door trim. In this manner, the airbag main body section can be effectively unfolded inside the vehicle compartment.

In addition, in the airbag of the present disclosure, the airbag main body section has the main body inflation section communicating with the gas introduction section, and the protrusion section communicating with the main body inflation section and extending to a side opposite to the gas introduction section with reference to the main body inflation section. The first roll fold section is formed by folding the protrusion section in a roll shape, and the second roll fold section is formed by folding at least a portion of the main body inflation section connected to the protrusion section in a roll shape.

According to the aspect, in the airbag of the present disclosure, the unfolding behavior can be stabilized, even in the airbag main body section which has the protrusion section protruding from the main body inflation section to the side opposite to the gas introduction section.

In addition, in the airbag of the present disclosure, the airbag main body section in the folded state has the bellows fold section stacked on the outside of the second roll fold section. The bellows fold section is formed by folding the remaining other portion of the main body inflation section in a bellows shape.

According to the aspect, in the airbag of the present disclosure, when the gas is supplied from the gas introduction section to the airbag main body section, the bellows fold section is quickly unfolded earlier than the second roll fold section and the first roll fold section. The second roll fold section and the first roll fold section can be pushed to the tip side. Therefore, the tip side of the airbag main body section can be more reliably brought into contact with the door trim, and the airbag main body section can be more effectively unfolded inside the vehicle compartment.

According to the present disclosure, there is provided the folding method of the airbag including the airbag main body section formed in a bag shape, and the gas introduction section that communicates with the airbag main body section, and to which gas is supplied, in which the gas is supplied to the airbag main body section via the gas introduction section so that the airbag main body section in a folded state is laterally unfolded into a vehicle compartment. The folding method of the airbag includes the first step of forming the first roll fold section by folding a portion on the tip side of the airbag main body section in the unfolding direction in a roll shape by using the rod-shaped first jig installed along the direction intersecting with the unfolding direction of the airbag main body section, and the second step of forming the second roll fold section by folding at least a portion of the remaining portion of the airbag main body section in a roll shape by using the rod-shaped second jig installed along the direction intersecting with the unfolding direction at the winding end position of the first roll fold section.

According to the aspect, in the folding method of the airbag of the present disclosure, when the gas is introduced into the airbag main body section from the gas introduction section, the airbag main body section is brought into the unfolding mode in which the roll is gradually released from the second roll fold section to the first roll fold section. Therefore, the unfolding behavior is stabilized. Even when the collision speed is fast and the collision weight is heavy during the side collision and the door trim forcibly enters the inside of the vehicle compartment, the tip side of the airbag main body section comes into contact with door trim. In this manner, the airbag main body section can be effectively unfolded inside the vehicle compartment.

In addition, in the folding method of the airbag of the present disclosure, the airbag main body section has the main body inflation section communicating with the gas introduction section, and the protrusion section communicating with the main body inflation section and extending to a side opposite to the gas introduction section with reference to the main body inflation section. The first step is the step of folding the protrusion section in a roll shape. The second step is the step of folding at least a portion of the main body inflation section connected to the protrusion section in a roll shape.

According to the aspect, in the folding method of the airbag of the present disclosure, the unfolding behavior can be stabilized, even in the airbag main body section which has the protrusion section protruding from the main body inflation section to the side opposite to the gas introduction section.

In addition, the folding method of the airbag of the present disclosure further includes the third step of forming the bellows fold section by folding the remaining other portion of the main body inflation section connected to the second roll fold section in a bellows shape.

According to the aspect, in the folding method of the airbag of the present disclosure, when the gas is supplied from the gas introduction section to the airbag main body section, the bellows fold section is quickly unfolded earlier than the second roll fold section and the first roll fold section. The second roll fold section and the first roll fold section can be pushed to the tip side. Therefore, the tip side of the airbag main body section can be more reliably brought into contact with the door trim, and the airbag main body section can be more effectively unfolded inside the vehicle compartment.

The present disclosure is not limited to the description of the above-described embodiments, and various modifications can be made within the scope not departing from the concept of the present disclosure.

INDUSTRIAL APPLICABILITY

For example, the present disclosure is applicable to an airbag and an airbag apparatus, which are attached along a window section of a lateral part of an automobile, and are unfolded to protect an occupant.

REFERENCE SIGNS LIST

10 Airbag
11 Airbag apparatus
32 Gas introduction section
33 Airbag main body section
37 Main body inflation section
38 Protrusion section
45 First roll fold section
46 Second roll fold section
47 Bellows fold section
S1 First saber (first jig)
S2 Second saber (second jig)

The invention claimed is:

1. An airbag comprising:
an airbag main body section formed in a bag shape; and
a gas introduction section that communicates with the airbag main body section, and to which gas is supplied,
wherein the gas is supplied to the airbag main body section via the gas introduction section so that the airbag main body section in a folded state is laterally unfolded inside a vehicle compartment, and
the airbag main body section in the folded state has a first roll fold section formed by folding a tip side in an unfolding direction, and a second roll fold section formed by folding at least a portion on a base end side in the unfolding direction from the first roll fold section, and having a roll center at a position different from a roll center of the first roll fold section,
wherein the airbag main body section has a main body inflation section communicating with the gas introduction section, and a protrusion section communicating with the main body inflation section and extending to a side opposite to the gas introduction section with reference to the main body inflation section,
the first roll fold section is formed by folding the protrusion section in a roll shape, and
the second roll fold section is formed by folding at least a portion of the main body inflation section connected to the protrusion section in a roll shape.

2. An airbag comprising:
an airbag main body section formed in a bag shape; and
a gas introduction section that communicates with the airbag main body section, and to which gas is supplied,
wherein the gas is supplied to the airbag main body section via the gas introduction section so that the airbag main body section in a folded state is laterally unfolded inside a vehicle compartment, and
the airbag main body section in the folded state has a first roll fold section formed by folding a tip side in an unfolding direction, and a second roll fold section formed by folding at least a portion on a base end side in the unfolding direction from the first roll fold section, and having a roll center at a position different from a roll center of the first roll fold section, wherein the airbag main body section has a main body inflation section communicating with the gas introduction section, and a protrusion section communicating with the main body inflation section and extending to a side opposite to the gas introduction section with reference to the main body inflation section, the first roll fold section is formed by folding the protrusion section in a roll shape, and the second roll fold section is formed by folding at least a portion of the main body inflation section connected to the protrusion section in a roll shape, wherein the airbag main body section in the folded state has a bellows fold section stacked on an outside of the second roll fold section, and the bellows fold section is formed by folding a remaining other portion of the main body inflation section in a bellows shape.

\* \* \* \* \*